April 25, 1972  KEIZO UZU ET AL  3,658,794
ALKYL MITOMYCINS

Filed July 8, 1969  5 Sheets-Sheet 1

INVENTORS
KEIZO UZU
KINICHI NAKANO
TOSHINAKA TAKAHASHI
BY Bacon & Thomas
ATTORNEYS

United States Patent Office 3,658,794
Patented Apr. 25, 1972

---

3,658,794
ALKYL MITOMYCINS
Keizo Uzu, Kinichi Nakano, and Toshinaka Takahashi, Tokyo-to, Japan, assignors to Kyowa Hakko Kogyo Kabushiki Kaisha, Tokyo-to, Japan
Filed July 8, 1969, Ser. No. 839,922
Claims priority, application Japan, July 12, 1968, 43/48,432, 43/49,640; July 16, 1968, 43/50,499; July 24, 1968, 43/51,867
Int. Cl. C07d 57/02
U.S. Cl. 260—239 EQ     20 Claims

ABSTRACT OF THE DISCLOSURE

Compounds of the formula

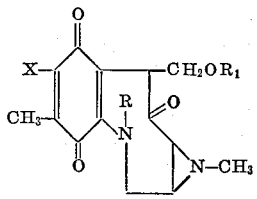

Figure 1:
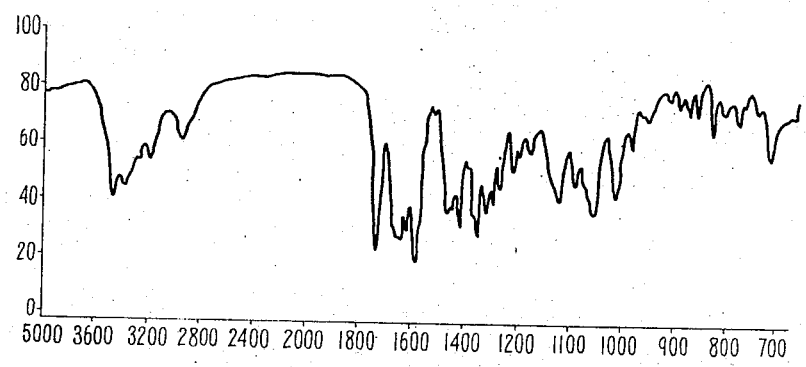

and processes for their preparation are provided wherein X is methoxy or $NR_2R_3$, R is lower alkyl, $R_1$ is hydrogen, $CONH_2$, $COR_4$ or $SO_2R_5$, $R_2$ and $R_3$ are each hydrogen, aliphatic or aromatic and $R_4$ and $R_5$ are each aliphatic or aromatic. These compounds are antibiotics.

BACKGROUND OF THE INVENTION AND DESCRIPTION OF THE PRIOR ART

The mitomyficin of Formula I is a known antibiotic and, additionally, finds use in treating tumors. This mitomycin, however, is strongly toxic and has undesirable side effects. This mitomycin may reasonably be considered to have a corresponding tautomeric structure of Formula II. Accordingly, it will be understood that reference in the present specification to the mitomycin of Formula I additionally implies reference to its corresponding tautomeric structure of Formula II. The mitomycin of Formula I will be referred to herein as mitomycin B or simply as mitomycin.

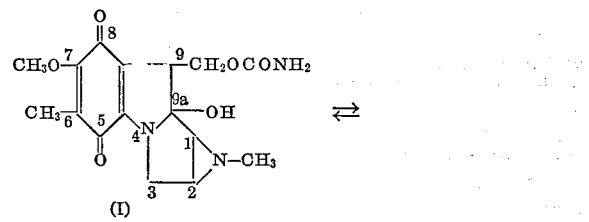

DESCRIPTION OF THE INVENTION

An object of the present invention is the provision of derivatives of the mitomycin of Formula I which are effective antibiotics. A further object of the present invention is the provision of processes for preparing these derivatives of the mitomycin of Formula I.

According to the present invention, derivatives of the mitomycin of Formula I of the formula

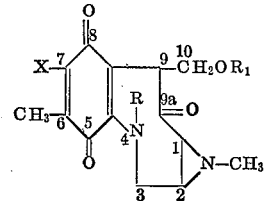

and processes for their preparation are provided wherein X is methoxy or $NR_2R_3$, R is lower alkyl, $R_1$ is hydrogen, $CONH_2$, $COR_4$ or $SO_2R_5$, $R_2$ and $R_3$ are each hydrogen, aliphatic or aromatic and $R_4$ and $R_5$ are each aliphatic or aromatic.

According to the first aspect of the invention, derivatives of the mitomycin of Formula I of the formula

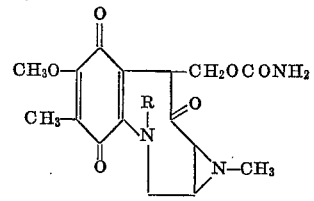

are provided wherein R is lower alkyl. These derivatives of the mitomycin of Formula I are generically referred to herein as alkyl mitomycin B or simply as alkyl mitomycins. The derivatives of the mitomycin of Formula I according to this aspect of the invention have a strong inhibiting activity on the growth of bacteria and are important as intermediates for synthesizing useful derivatives. The minimum concentration of the mitomycin of Formula IV where R is methyl and γ/ml. of solution necessary to inhibit the growth of six representative types of pathogenic bacteria is set forth in Table 1.

TABLE 1

| Bacteria: | γ/ml. |
|---|---|
| Bacillus subtilis (ATCC 6633) | 0.039 |
| Staphylococcus aureus (ATCC 21027) | 0.156 |
| Sarcina lutea (ATCC 9341) | 0.039 |
| Escherichia coli (ATCC 14948) | 0.781 |
| Pseudomonas aeruginosa (ATCC 15246) | 3.12 |
| Proteus vulgaris (ATCC 6897) | 3.12 |

According to the second aspect of the invention, a process for preparing alkyl mitomycins of Formula IV wherein R is lower alkyl is provided wherein the mitomycin of Formula I is reacted with an alkali metal hydride in the presence of solvent and then reacted with an alkylating agent to alkylate the nitrogen at the 4-position of the mitomycin of Formula I.

Describing the second aspect of the invention in detail, the mitomycin B of Formula I is dissolved in a solvent which is inactive to the reactants which can be exemplified by organic solvents such as aromatic hydrocarbons (e.g., benzene, toluene) and ethers (e.g., ether, tetrahydrofuran, dioxane) and polar, non-proton solvents such as dimethyl formamide and dimethyl sulfoxide and is subjected to reaction with an alkali metal hydride such as sodium hydride, potassium hydride or lithium hydride. The amount of alkali metal hydride employed is preferably more than the theoretical amount required for reaction and one or more of the above mentioned solvents may be used in combination. The color of the reaction mixture *urns from purple to dark blue.

An alkylating agent such as a lower alkyl halogenide (e.g., methyl iodide, ethyl iodide) or a dialkyl sulfate is then added to the reaction mixture and the reaction mixture is stirred. The color of the reaction mixture gradually turns to reddish purple to give the desired product according to the first aspect of the invention. The carrying out of thin layer chromatography on silica-gel using a 1:1 ratio acetone:chloroform solvent results in the gradual accumulation of reddish purple material at the upper layer of mitomycin B of Formula I. The starting material, mitomycin B of Formula I, finally almost disappears.

The reaction according to the second aspect of the invention can easily be carried out at ambient temperature or more generally at a temperature between 0° C. and the boiling point of the solvent employed. The reaction period may vary depending upon the solvent employed and the reaction temperature; however, the reaction is preferably completed within 10 hours. After the completion of the reaction, excess alkali metal hydride is decomposed by the addition of water-containing ethyl acetate. After removing insoluble material by filtration, the desired product is isolated by means of silica-gel column chromatography.

According to the third aspect of the invention, derivatives of alkyl mitomycins of Formula IV of the formula

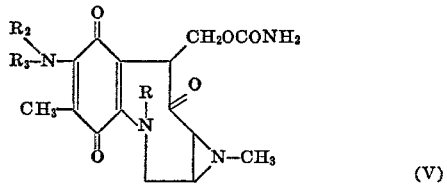

(V)

are provided wherein R is lower alkyl and $R_2$ and $R_3$ are each hydrogen, aliphatic or aromatic. The aliphatic group is preferably an aliphatic hydrocarbon group such as lower alkyl and the aromatic group is preferably a monocyclic aromatic group such as a phenyl radical. These derivatives of alkyl mitomycins of Formula IV are generically referred to herein as 7-amino alkyl mitomycin B or simply as 7-amino alkyl mitomycins. Alkyl mitomycin derivatives according to this aspect of the invention have a strong inhibition action on the growth of various bacteria and are less toxic. They are also important as intermediates for the synthesis of other useful mitomycin derivatives. The minimum concentration of representative 7-amino alkyl mitomycins of Formula V in $\gamma$/ml. of solution necessary to inhibit the growth of six representative types of pathogenic bacteria is shown in Table 2.

TABLE 2

| Bacteria | R=CH₃ R₂=H R₃=H | CH₃ ⌬ H | CH₃ CH₃ H |
|---|---|---|---|
| Bacillus subtilis (ATCC 6633) | 0.097 | 0.097 | 0.39 |
| Staphylococcus aureus (ATCC 21027) | 0.39 | 0.39 | 3.125 |
| Sarcina lutea (ATCC 9341) | 0.39 | 0.39 | 6.25 |
| Escherichia coli (ATCC 14948) | 0.89 | 1.562 | 6.25 |
| Pseudomonas aeruginosa (ATCC 15246) | 6.25 | >25 | >25 |
| Proteus vulgaris (ATCC 6897) | 6.25 | >25 | >25 |

According to the fourth aspect of the invention, a process for preparing 7-amino alkyl mitomycins of Formula V is provided wherein the methoxy group at the 7-position of an alkyl mitomycin of Formula IV is converted into an amino group with ammonia or a primary or secondary amine of the formula $R_2R_3NH$ where $R_2$ and $R_3$ are as defined according to the third aspect of the invention. The alkyl mitomycin of Formula IV is dissolved in a solvent which can be a lower alcohol such as methanol, ethanol, propanol or butanol, a polar, non-proton solvent such as dimethylformamide or dimethylsulfoxide or water or mixtures thereof and the 7-methoxy group is then aminated by addition of ammonia or a primary or secondary amine to produce a 7-amino alkyl mitomycin of Formula V.

More than the theoretical amount of ammonia or amine required for complete reaction is used and an amount greatly in excess of the theoretical amount may be used without any difficulty. The reaction can easily be carried out at ambient temperature or more generally at a temperature from 0° C. to the boiling point of the solvent used.

According to the fifth aspect of the invention, derivatives of alkyl mitomycins of Formula IV and 7-amino alkyl mitomycins of Formula V of the formula

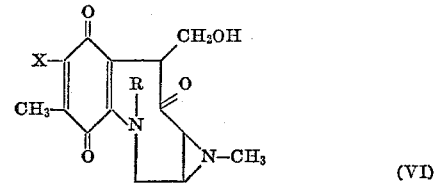

(VI)

are provided wherein X is methoxy or $NR_2R_3$, R is lower alkyl, and $R_2$ and $R_3$ are each hydrogen, aliphatic or aromatic hydrocarbon. The aliphatic group is preferably an aliphatic hydrocarbon group such as lower alkyl and the aromatic group is preferably a monocyclic aromatic group such as a phenyl radical. These derivatives of the mitomycins of Formulas IV and V are generically referred to herein as decarbamoyl alkyl mitomycin B or simply as decarbamoyl alkyl mitomycins. The compounds according to this aspect of the invention have various advantages owing to their low toxicity and strong inhibiting activity on bacteria. They are also important as intermediates for synthesizing further useful compounds. The minimum concentration of the decarbamoyl alkyl mitomycin of Formula VI wherein X is $NR_2R_3$, $R_2$ and $R_3$ are each hydrogen and R is methyl (7-amino decarbamoyl methylmitomycin B) in $\gamma$/ml. of solution necessary to inhibit the growth of six representative types of pathogenic bacteria is shown in Table 3. The $LD_{50}$ value (intravenous, mice) for 7-amino decarbamoyl methylmitomycin B is 300 mg./kg.

TABLE 3

| Bacteria: | $\gamma$/ml. |
|---|---|
| Bacillus subtilis (ATCC 6633) | 0.781 |
| Staphylococcus aureus (ATCC 21027) | 3.125 |
| Sarcina lutea (ATCC 9341) | >25 |
| Escherichia coli (ATCC 14948) | 6.25 |
| Pseudomonas aeruginosa (ATCC 15246) | >25 |
| Proteus vulgaris (ATCC 6897) | >25 |

According to the sixth aspect of the invention, a process is provided for preparing compounds of Formula VI wherein X, R, $R_2$ and $R_3$ are as defined according to the fifth aspect of the invention by decarbamoylating the urethane group at the 9-position of the alkyl mitomycins of Formula IV or 7-amino alkyl mitomycins of Formula V.

Prior to the present invention, a process for selectively decarbamoylating the urethane group of mitomycins had never been reported. However, such a decarbamoylation process using an alkali metal alcoholate or reducing with lithium aluminum hydride is disclosed in our copending application Ser. No. 814,278, filed Apr. 8, 1969. The sixth aspect of the invention relates to a process for selectively decarbamoylating alkyl mitomycins of Formula IV and 7-amino alkyl mitomycins of Formula V with high yield by using an alkali metal alcoholate.

Describing the sixth aspect of the invention in detail, an alkyl mitomycin of Formula IV or 7-amino alkyl mitomycin of Formula V is subjected to reaction with an alcoholate prepared from a primary, secondary or tertiary alcohol such as a lower alkanol (e.g., methanol, ethanol, isopropanol, t-butanol) and an alkali metal such as sodium or potassium to give a decarbamoyl derivative represented by Formula VI. The solvents which may be used for the reaction include the alcohols which can be used for the preparation of the alcoholate although various other alcohols may also be used. Moreover, polar, non-proton solvents such as dimethyl formamide and dimethylsulfoxide can also be used. Furthermore, improved results can often be obtained by mixing such solvents with aromatic hydrocarbons such as benzene and toluene. It is usually advantageous to use the alcoholate in excess of the amount theoretically required for complete reaction. A concentration of alcoholate of from 1 to 5 N is preferable, however, the reaction may be carried out at other concentrations.

The reaction temperature can conveniently be varied from 0° C. to the boiling point of the solvent used. The reaction time may vary depending on the starting material, alcoholate, temperature, concentration, and type of solvent, etc. used. The reaction can usually be completed within 4 to 18 hours when carried out at room temperature with vigorous stirring. After completion of the reaction, the reaction mixture is combined with a large amount of water and the desired product is extracted with a suitable organic solvent. Alternatively, the reaction mixture is blown with carbon dioxide for neutralizing and is extracted with a suitable solvent to recover the desired decarbamoyl alkyl mitomycin product.

According to the seventh aspect of the invention, derivatives of the decarbamoyl alkyl mitomycins of Formula VI of the formula

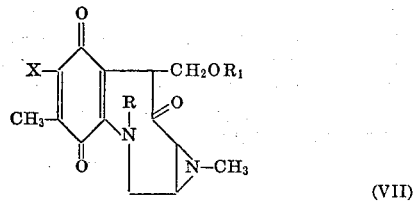

(VII)

are provided wherein X is methoxy or $NR_2R_3$, R is lower alkyl, $R_1$ is hydrogen, $COR_4$ or $SO_2R_5$, $R_2$ and $R_3$ are each hydrogen, aliphatic or aromatic and $R_4$ and $R_5$ are each aliphatic or aromatic. The aliphatic group is preferably an aliphatic hydrocarbon group such as lower alkyl and the aromatic group is preferably a monocyclic aromatic group such as a phenyl radical. $R_4$ and $R_5$ may each be, for example, halogen substituted lower alkyl or lower alkyl substituted phenyl. These derivatives of the decarbamoyl alkyl mitomycins of Formula VI are generically referred to herein as either 10-acyloxy decarbamoyl alkyl mitomycin B or simply as 10-acyloxy decarbamoyl alkyl mitomycins ($R_1$ is $COR_4$) or 10-sulfonyloxy decarbamoyl alkyl mitomycin B or simply 10-sulfonyloxy decarbamoyl alkyl mitomycins ($R_1$ is $SO_2R_5$). The compounds of Formula VII have low toxicity and a strong growth inhibiting effect on bacteria. The minimum concentration of representative compounds of Formula VII wherein R is methyl and X and $R_1$ are as defined in the table in γ/ml. of solution necessary to inhibit the growth of six representative types of pathogenic bacteria is shown in Table 4.

alkyl mitomycins of Formula VI with an acylating agent or a sulfonic acid halogenide.

Describing the eighth aspect of the invention in detail, a decarbamoyl alkyl mitomycin of Formula VI is reacted with a carboxylic acid halogenide represented by the formula $R_4COY$ wherein $R_4$ is as defined according to the seventh aspect of the invention and Y is halogen, a carboxylic acid anhydride represented by the formula $(R_4CO)_2O$ or a sulfonic acid halogenide represented by the formula $R_5SO_2Y$ wherein $R_5$ is as defined according to the seventh aspect of the invention and Y is halogen in the presence of an organic base such as pyridine, picoline or triethylamine. Any suitable organic solvent which does not inhibit the reaction may be used. Suitable organic solvents can be exemplified by aromatic hydrocarbons such as benzene and toluene and ethers such as ether, tetrahydrofuran and dioxane. The reaction is preferably carried out at a temperature from 0° C. to ambient temperature but the reaction can, if desired, be carried out at up to about 100° C.

The amount of carboxylic acid halogenide, carboxylic acid anhydride or sulfonic acid halogenide used may be equal to or more than the theoretical amount required for complete reaction (preferably 2–10 times). The amount of organic base used may be equal to or more than the amount of carboxylic acid halogenide, carboxylic acid anhydride or sulfonic acid halogenide used. The reaction is carried out until the starting material can barely be detected by thin layer chromatography. The reaction period may vary depending upon the starting material and reaction conditions, but the reaction usually is concluded within 1–24 hours. Various methods can be applied for isolating and purifying the desired product after completion of the reaction. For example, the reaction solvent and excess reagents can be removed by distillation or the reaction mixture can be combined with a large amount of water and extracted with an organic solvent. The extract is washed with a weakly alkaline aqueous solution such as sodium bicarbonate solution and the solvent is removed by distillation in vacuo. The product is crystallized, if desired, after purification by silica-gel chromatography.

The following non-limitative examples illustrate the invention:

EXAMPLE 1

One (1) gram of the mitomycin of Formula I (mitomycin B) was dissolved in a mixed solvent of absolute benzene (36 ml.) and dimethylformamide (4 ml.). Four hundred (400) milligrams of sodium hydride (50%) were added and the reaction mixture was stirred at room temperature. The color of the solution turned from purple to dark blue. Two (2) milliliters of methyl iodide was added to the reaction mixture and the reaction mixture was continuously stirred. The color of the reaction mixture gradually turned to reddish purple. The reaction was discontinued after about one hour after the spot of

TABLE 4

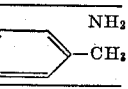

| Bacteria | X=$NH_2$ $R_1$=$COCH_3$ | $NH_2$ $COCH_2Cl$ | $NH_2$ $SO_2$—⟨phenyl⟩—$CH_3$ |
|---|---|---|---|
| Bacillus subtilis (ATCC 6633) | 1.562 | 6.25 | >25 |
| Staphylococcus aureus (ATCC 21027) | 12.5 | >25 | >25 |
| Sarcina lutea (ATCC 9341) | 3.125 | >25 | 3.125 |
| Escherichia coli (ATCC 14948) | 3.125 | 25 | >25 |
| Pseudomonas aeruginosa (ATCC 15246) | >25 | >25 | >25 |
| Proteus vulgaris (ATCC 6897) | >25 | >25 | >25 |

The $LD_{50}$ (intravenous, mice) of the 10-acyloxy decarbamoyl alkyl mitomycin of Formula VII wherein X is $NR_2R_3$, $R_2$ and $R_3$ are each hydrogen, R is methyl and $R_1$ is chloroacetyloxy (7-amino-10-chloroacetyloxy decarbamoyl methylmitomycin B) is 300 mg./kg.

According to the eighth aspect of the invention, a process is provided for preparing compounds of Formula VII wherein X, R and $R_1$ are as defined according to the seventh aspect of the invention by reacting decarbamoyl the starting material on thin layer chromatography had disappeared. Immediately thereafter the remaining sodium hydride was decomposed by adding water-containing ethyl acetate and the resulting insoluble material was removed by filtration. The filtrate was concentrated in vacuo to remove solvent and the residue was subjected to silica-gel chromatography for purification. Developing with a mixture of acetone and chloroform, the main fractions were collected and the solvent was removed by evaporation in vacuo. Crystallizing from ethyl acetate, reddish purple needle crystals were obtained. Yield: 315 milligrams. The infra-red spectrum of the resulting compound of Formula IV wherein R is methyl (methyl mitomycin B) is shown in FIG. 1.

EXAMPLE 2

A similar treatment to that described in Example 1 was carried out using absolute tetrahydrofuran (100 mg.) in place of the absolute benzene and dimethylformamide. The reaction was discontinued after about five hours. The infrared spectrum of the resulting crystals was identical with that in FIG. 1.

EXAMPLE 3

Figure 2:
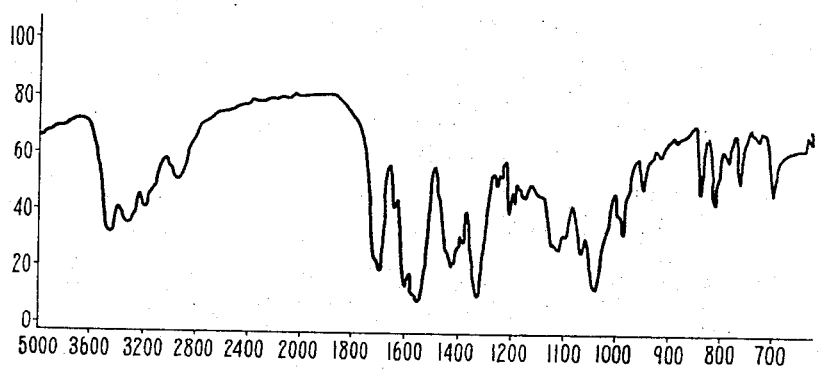

One hundred (100) milligrams of the compound of Formula IV wherein R is methyl (methyl mitomycin B) were dissolved in ten (10) milliliters of methanol and were blown well with dry ammonia gas. The reaction was completed within one hour when the spot of the starting material was found with thin layer chromatography to have disappeared. The solvent was removed by evaporation in vacuo and the residue was crystallized from acetone to yield black purple needle crystals (65 mg.) of the compound of Formula V wherein $R_2$ and $R_3$ are hydrogen and R is methyl (7-amino methyl mitomycin B). If desired, the crude product can be further purified by silica-gel chromatography. The infra-red spectrum of the obtained compound is shown in FIG. 2.

EXAMPLE 4

A similar treatment to that described in Example 3 was carried out using one (1) milliliter of concentrated aqueous ammonia in place of the dry ammonia gas. The infra-red spectrum of the obtained product was identical with that shown in FIG. 2.

EXAMPLE 5

A similar treatment to that described in Example 3 was carried out using dimethylformamide in place of methanol. The reaction time was significantly shorter than that of Example 3. The infra-red spectrum of the obtained product was identical with that shown in FIG. 2.

EXAMPLE 6

Figure 3:
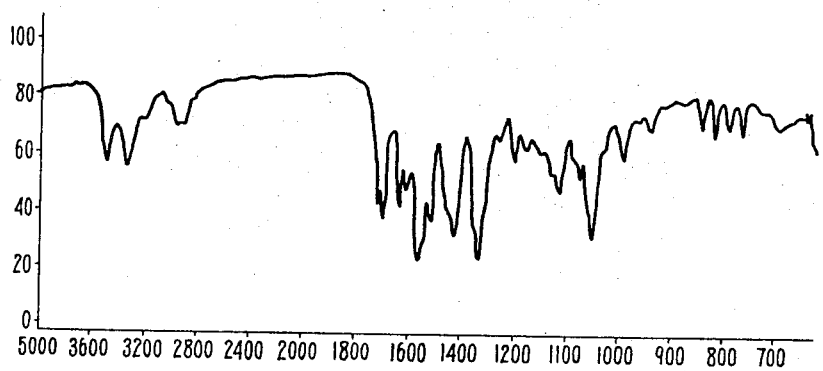

One hundred (100) milligrams of the compound of Formula IV wherein R is methyl (methyl mitomycin B) were dissolved in a methanol solution (10 ml.) containing methyl amine (1 gr.) and the mixture was allowed to stand at room temperature. The reaction was completed within 10 minutes which was confirmed by thin layer chromatography. The solvent was removed by evaporation in vacuo. Silica-gel column chromatography can, if desired, be carried out for purification. Crystallization from ethyl acetate yielded blackish green crystals (75 mg.) of the compound of Formula V wherein one of $R_2$ and $R_3$ is methyl and the other is hydrogen and R is methyl (7-methylamino methyl mitomycin B). The infra-red spectrum of this compound is shown in FIG. 3.

EXAMPLE 7

Figure 4:
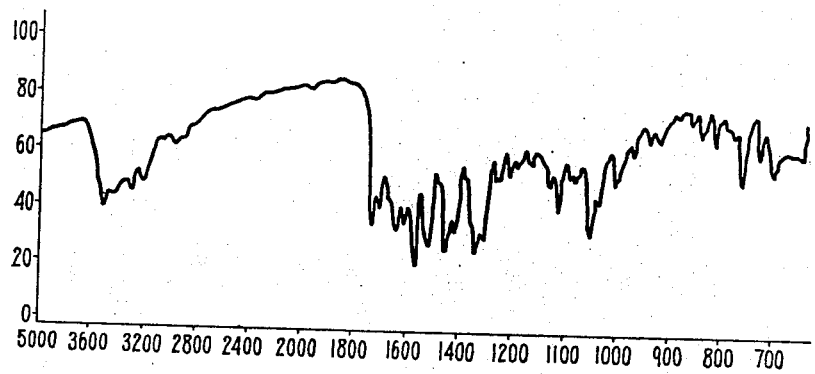

One hundred (100) milligrams of the compound of Formula IV wherein R is methyl (methyl mitomycin B) were dissolved in 100 milligrams of methanol and one milliliter of aniline was added. The mixture was allowed to stand for a night at ambient temperature for completion of the reaction. The solvent and the excess aniline were removed by evaporation in vacuo. If desired, silica-gel column chromatography can be carried out for purification. Crystallization from ethyl acetate yielded dark green crystals (60 mg.) of the compound of Formula V wherein one of $R_2$ and $R_3$ is phenyl and the other is hydrogen and R is methyl (7-anilino methyl mitomycin B). The infrared spectrum of this compound is shown in FIG. 4.

EXAMPLE 8

Figure 5:
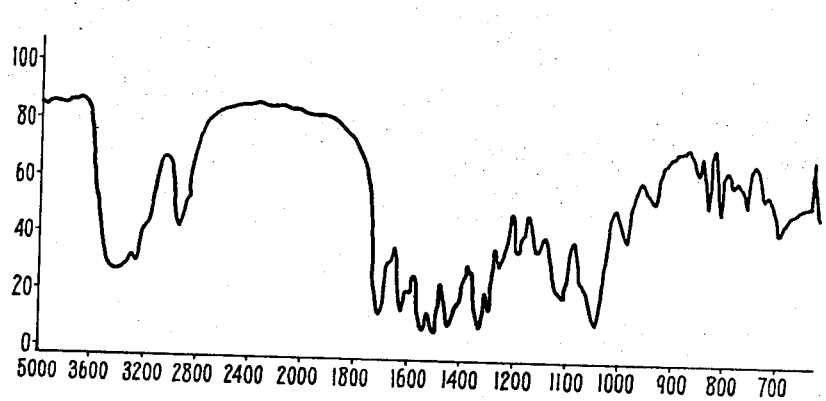

One hundred (100) milligrams of the compound of Formula IV wherein R is methyl (methyl mitomycin B) were dissolved in 10 milliliters of methanol and one milliliter of isopropyl amine was added. The reaction was completed within 10 minutes. The solvent and the excess isopropyl amine were removed by evaporation in vacuo. Silica-gel column chromatography was then carried out for purification. Crystallization from ethyl acetate yielded 50 mg. of black crystals of the compound of Formula V wherein one of $R_2$ and $R_3$ is isopropyl and the other is hydrogen and R is methyl (7-isopropyl-amino methyl mitomycin B). The infra-red spectrum of this compound is shown in FIG. 5.

EXAMPLE 9

One hundred (100) milligrams of the compound of Formula IV wherein R is methyl (methyl mitomycin B) were dissolved in 10 milligrams of methanol and one milliliter of a 40% aqueous solution of dimethylamine was added. The mixture was allowed to stand at ambient temperature and the reaction was completed within 10 minutes. The reaction mixture was subjected to silica-gel thin layer chromatography using acetone-chloroform (1:1) as solvent. The yellowish green spot of the reaction product was observed slightly below the spot of the starting material. Immediately thereafter solvent was removed by evaporation in vacuo to obtain 80 mg. of dark green crystals of the compound of Formula V wherein $R_2$ and $R_3$ are both methyl and R is methyl (7-dimethyl-amino methyl mitomycin B).

EXAMPLE 10

Figure 6:
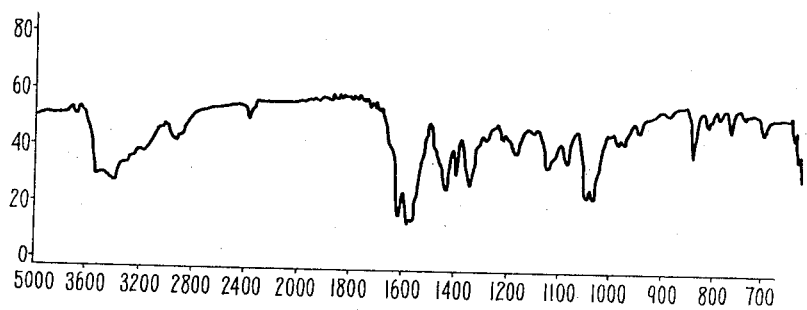

Five hundred (500) milligrams of the compound of Formula V wherein $R_2$ and $R_3$ are both hydrogen and R is methyl (7-amino methyl mitomycin B) were dissolved in a mixture of 100 ml. of 3 N methanol solution of sodium methylate and 100 ml. of absolute benzene. The reaction mixture was then vigorously stirred at room temperature. The reaction was completed after about four hours which was confirmed by thin layer chromatography. The reaction mixture was combined with a large amount of water and extracted with ethyl acetate. The extract was dried and the solvent was removed by evaporation to yield black crystals. Recrystallization from acetone-petroleum ether gave 360 mg. of black needle crystals of the compound of Formula VI where X is $NR_2R_3$, $R_2$ and $R_3$ are hydrogen and R is methyl (7-amino decarbamoyl methyl mitomycin B). The crystals had an infra-red spectrum as determined by using the KBr tablet method as shown in FIG. 6.

EXAMPLE 11

A similar treatment to that described in Example 10 was carried out using 500 mg. of the compound of Formula IV wherein R is methyl (methyl mitomycin B). The reaction, which was completed after 18 hours, yielded the compound of Formula VI wherein X is methoxy and R is methyl (decarbamoyl methyl mitomycin B). The product was not crystallized but was purple-colored and oily even when repeatedly purified by silica-gel chromatography.

EXAMPLE 12

Five hundred (500) milligrams of the compound of Formula V wherein $R_2$ and $R_3$ are hydrogen and R is methyl (7-amino methyl mitomycin B) were dissolved in 100 ml. of a 2 N tertiary-butanol solution of potassium tertiary-butylate. The reaction was carried out in a similar manner to that described in Example 10. The infra-red spectrum of the resulting crystals was identical with that of FIG. 6.

EXAMPLE 13

Figure 7:
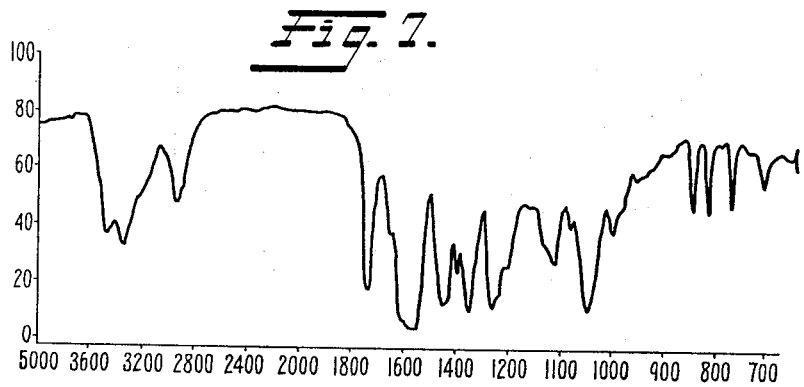

One hundred (100) milligrams of the compound of Formula VI wherein X is $NR_2R_3$, $R_2$ and $R_3$ are both hydrogen, and R is methyl (7-amino decarbamoyl methyl mitomycin B) were dissolved in a mixture of 1 ml. of acetic anhydride and 1 ml. of pyridine and the mixture was allowed to stand at ambient temperature for one hour. The solvent was removed by evaporation in vacuo and the residue was purified by silica-gel chromatography. The resulting purple, oily substance was the compound of Formula VII wherein X is $NR_2R_3$, $R_2$ and $R_3$ are both hydrogen, R is methyl, $R_1$ is $COR_4$ and $R_4$ is methyl (7-amino-10-acetyloxy decarbamoyl methyl mitomycin B). The infra-red spectrum of this compound is shown in FIG. 7.

EXAMPLE 14

One hundred (100) milligrams of the compound of Formula VI wherein X is methoxy and R is methyl (decarbamoyl methyl mitomycin B) was treated in a similar manner to that described in Example 13. The resulting purple, oily material was the compound of Formula VII wherein X is methoxy, R is methyl, $R_1$ is $COR_4$ and $R_4$ is methyl (10-acetyloxy decarbamoyl methyl mitomycin B).

EXAMPLE 15

Figure 8:
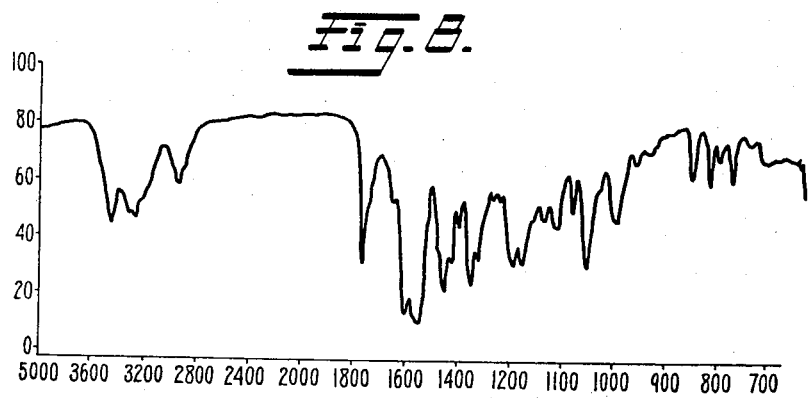

One hundred (100) milligrams of the compound of Formula VI wherein X is $NR_2R_3$, $R_2$ and $R_3$ are both hydrogen and R is methyl (7-amino decarbamoyl methyl mitomycin B) were dissolved in 5 ml. of triethylamine and then added dropwise with stirring to a mixture of chloroacetyl chloride (0.8 ml.) and absolute benzene (5 ml.) at 0° C. The reaction was discontinued after two hours. The reaction mixture was then combined with water and extracted with chloroform. The extract was washed with sodium bicarbonate solution and then with water and was dried uing anhydrous sodium sulfate. After removing the solvent by evaporation in vacuo, the residue was subjected to silica-gel chromatography to harvest a main fraction which was crystallized from acetone-petroleum ether to yield 20 mg. of black green material which was the compound of Formula VII wherein X is $NR_2R_3$, $R_2$ and $R_3$ are both hydrogen, R is methyl, $R_1$ is $COR_4$ and $R_4$ is chloromethyl (7-amino-10-chloroacetyloxy decarbamoyl methyl mitomycin B). The infra-red spectrum of this compound (using KBr tablet) is shown in FIG. 8.

EXAMPLE 16

Figure 9:
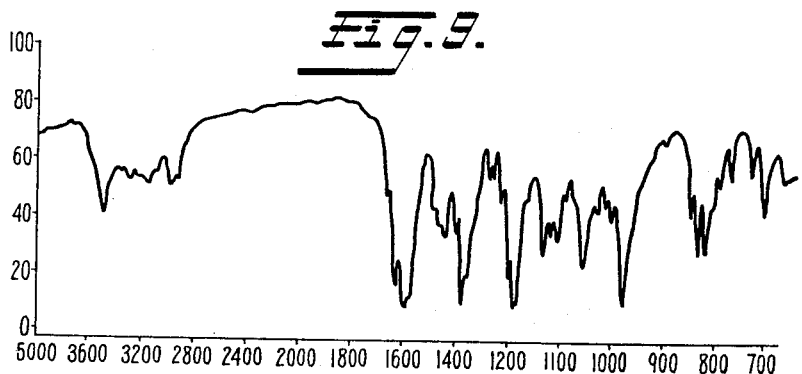

Fifty (50) milligrams of the compound of Formula VI wherein X is $NR_2R_3$, $R_2$ and $R_3$ are both hydrogen and R is methyl (7-amino decarbamoyl methyl mitomycin B) were dissolved in 1.5 ml. of pyridine and combined with 126 mg. of p-toluene sulfonic acid chloride. The mixture was stirred at 0° C. The reaction was discontinued after about 20 hours. The reaction mixture was combined with a large amount of water and extracted with chloroform. The extract was washed with sodium bicarbonate solution and subsequently with water. The extract was dried by using anhydrous sodium sulfate and the solvent was removed by evaporation in vacuo. After purification by silica-gel chromatography, the residue was crystallized from ethyl acetate to yield 20 mg. of dark brown grain crystals with an infra-red spectrum (using KBr tablet) as shown in FIG. 9. The crystals were the compound of Formula VII wherein X is $NR_2R_3$, $R_2$ and $R_3$ are both hydrogen, R is methyl, $R_1$ is $SO_2R_5$ and $R_5$ is p-methyl phenyl.

We claim:

1. A compound of the formula

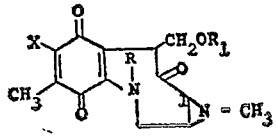

wherein X is methoxy or $NR_2R_3$, R is lower alkyl, $R_1$ is hydrogen, $CONH_2$, $COR_4$ or $SO_2R_5$, $R_2$ and $R_3$ are each hydrogen, lower alkyl or phenyl and $R_4$ and $R_5$ are each lower alkyl or phenyl.

2. The compound of claim 1 wherein X is methoxy, R is lower alkyl and $R_1$ is $CONH_2$.

3. The compound of claim 2 wherein R is methyl.

4. The compound of claim 1 wherein X is $NR_2R_3$, R is lower alkyl, $R_1$ is $CONH_2$ and $R_2$ and $R_3$ are each hydrogen, lower alkyl or phenyl.

5. The compound of claim 4 wherein R is methyl.

6. The compound of claim 5 wherein $R_2$ and $R_3$ are each hydrogen.

7. The compound of claim 5 wherein one of $R_2$ and $R_3$ is methyl and the other is hydrogen.

8. The compound of claim 5 wherein one of $R_2$ and $R_3$ is phenyl and the other is hydrogen.

9. The compound of claim 5 wherein one of $R_2$ and $R_3$ is isopropyl and the other is hydrogen.

10. The compound of claim 1 wherein X is methoxy or $NR_2R_3$, R is lower alkyl, $R_1$ is hydrogen, $R_2$ and $R_3$ are each hydrogen, lower alkyl or phenyl.

11. The compound of claim 10 wherein R is methyl.

12. The compound of claim 11 wherein X is $NR_2R_3$ and each of $R_2$ and $R_3$ are hydrogen.

13. The compound of claim 11 wherein X is methoxy.

14. The compound of claim 1 wherein X is methoxy or $NR_2R_3$, R is lower alkyl, $R_1$ is $COR_4$ or $SO_2R_5$, $R_2$ and $R_3$ are each hydrogen, lower alkyl or phenyl and $R_4$ and $R_5$ are each lower alkyl or phenyl.

15. The compound of claim 14 wherein R is methyl.

16. The compound of claim 15 wherein X is $NR_2R_3$ and each of $R_2$ and $R_3$ is hydrogen.

17. The compound of claim 16 wherein $R_1$ is $COR_4$ and $R_4$ is methyl.

18. The compound of claim 16 wherein $R_1$ is $COR_4$ and $R_4$ is chloromethyl.

19. The compound of claim 16 wherein $R_1$ is $SO_2R_5$ and $R_5$ is p-methyl phenyl.

20. A process for preparing the compound of claim 2 wherein a compound of the formula

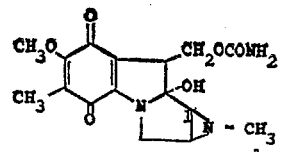

is reacted with an alkali metal hydride in the presence of a solvent selected from the group of solvents consisting of benzene, toluene, ether, tetrahydrofuran, dioxane, dimethylformamide, an dimethyl sulfoxide and the resulting reaction mixture is reacted with a lower alkyl halogenide or a dialkyl sulfate.

References Cited

UNITED STATES PATENTS 3,420,846  1/1969  Matsui et al. _____ 260—326.3

OTHER REFERENCES

Wagner et al., Synthetic Organic Chemistry (New York, 1953), pp. 169–170, 481–482, and 823.

ALTON D. ROLLINS, Primary Examiner

U.S. Cl. X.R.

260—326.3, 326.5 B; 424—244